UNITED STATES PATENT OFFICE.

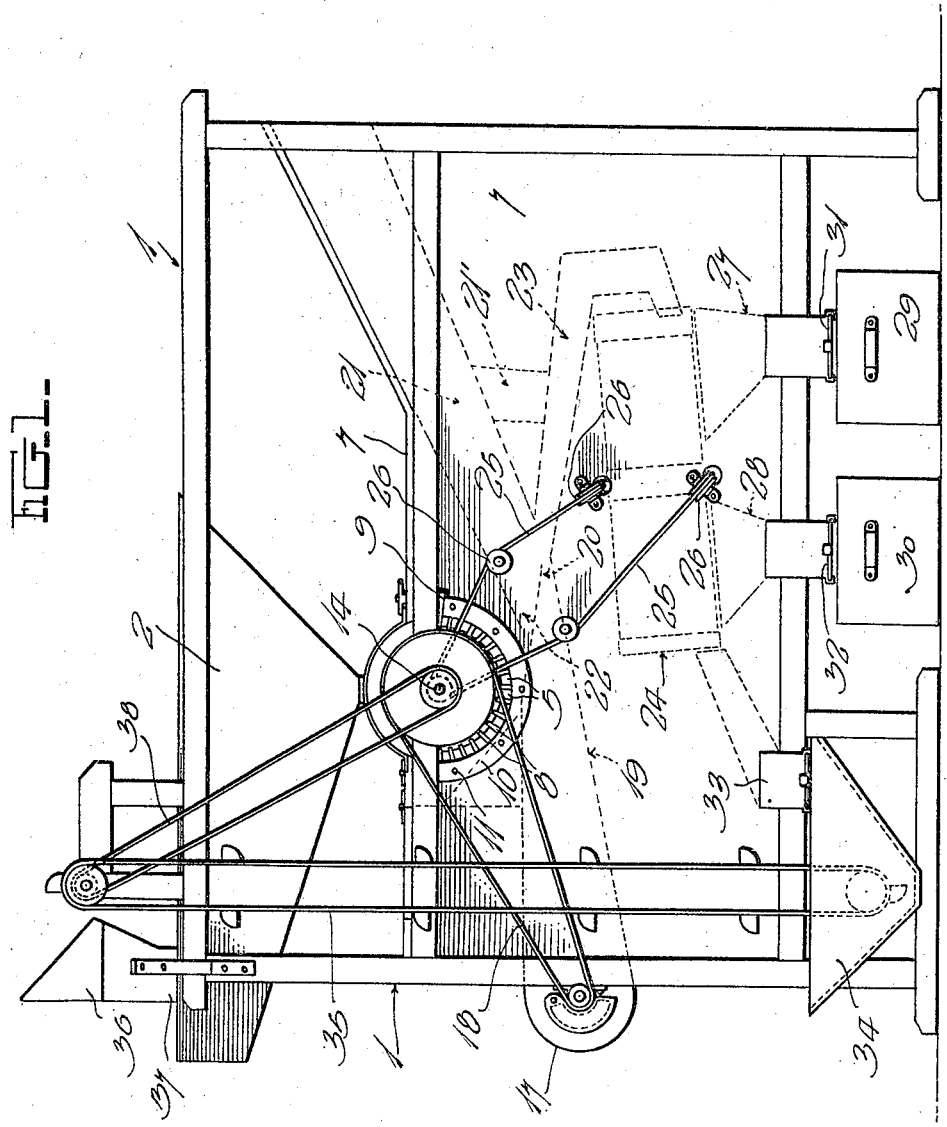

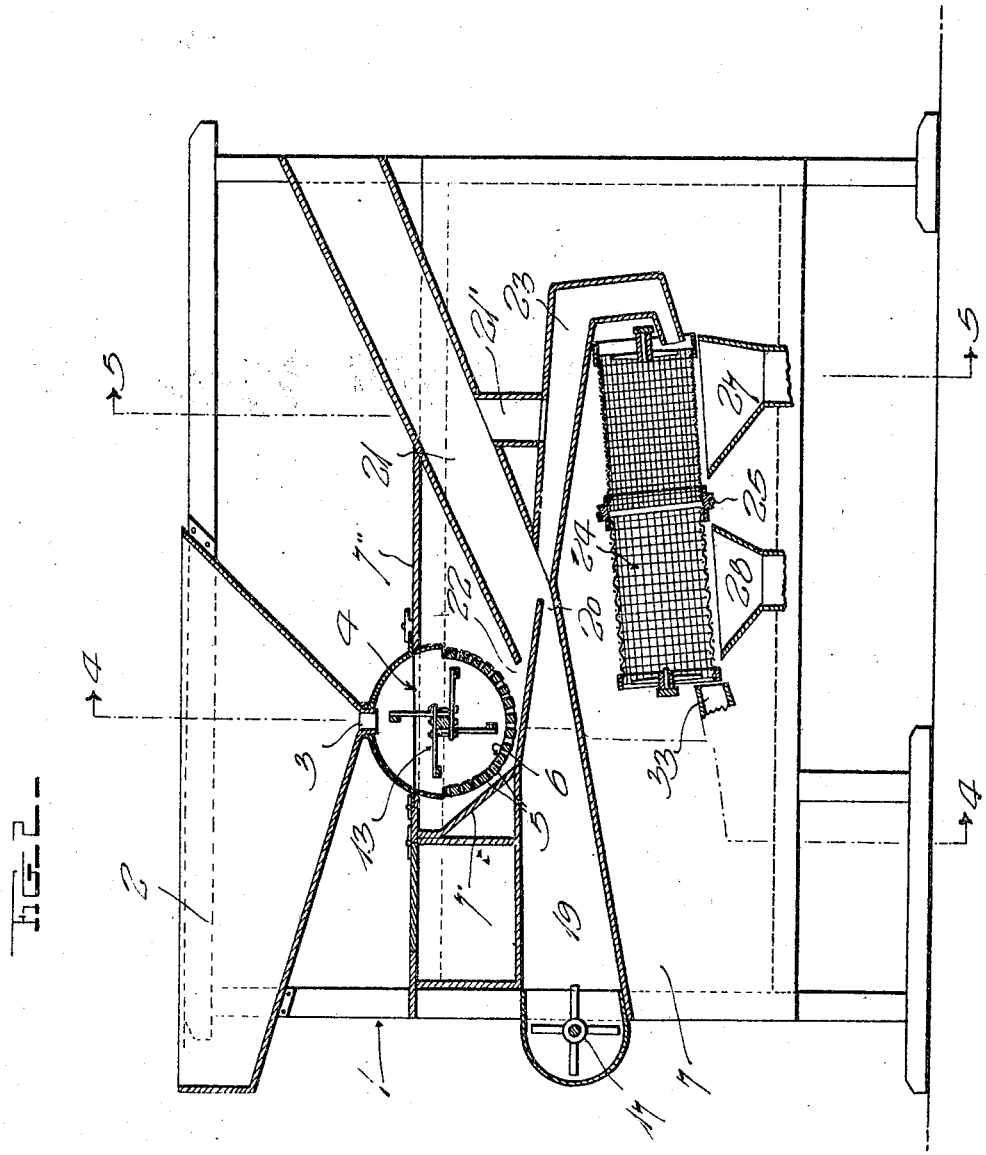

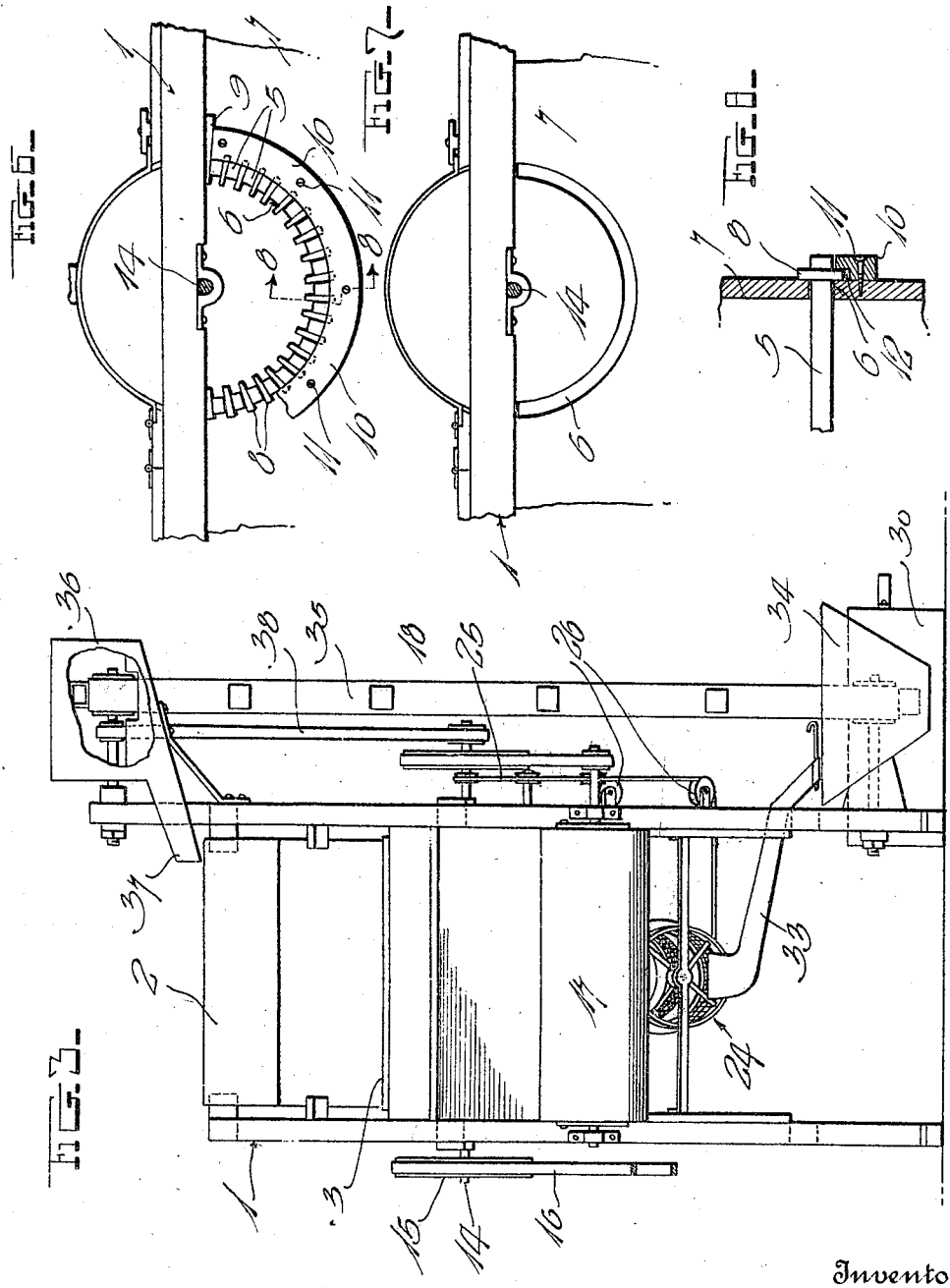

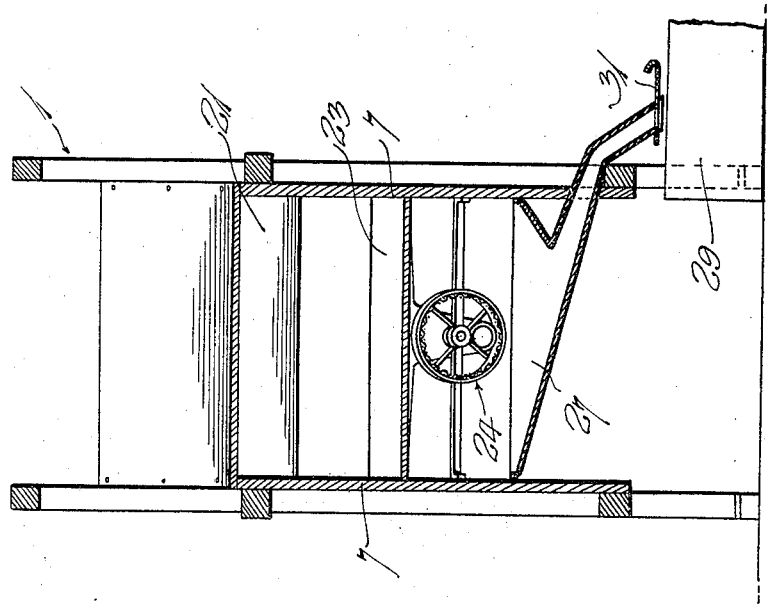
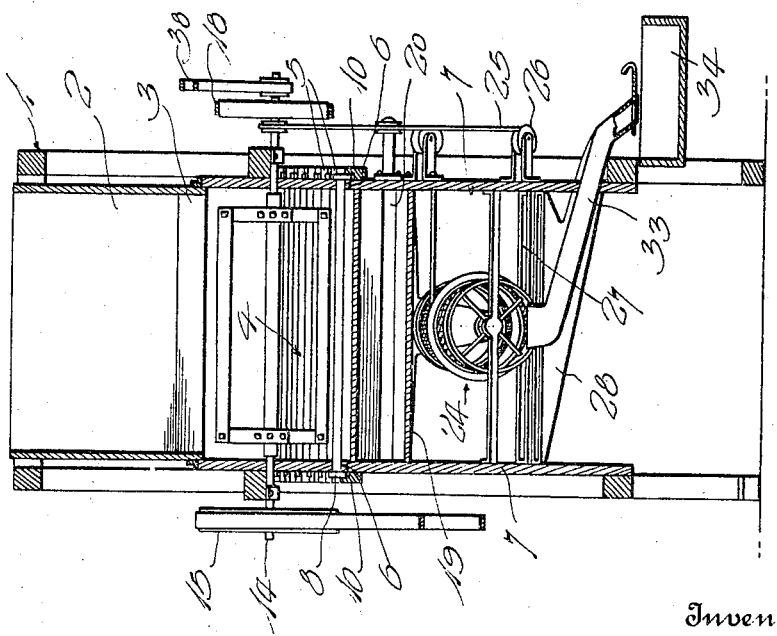

TROY T. AMMONS, OF LUMPKIN, GEORGIA.

HULLING-MACHINE.

1,326,164. Specification of Letters Patent. Patented Dec. 30, 1919.

Application filed August 5, 1918. Serial No. 248,449.

*To all whom it may concern:*

Be it known that I, TROY T. AMMONS, a citizen of the United States, residing at Lumpkin, in the county of Stewart and State of Georgia, have invented certain new and useful Improvements in Hulling-Machines; and I do declare the following to be a full, clear, and exact description of the invention, such as will enable others skilled in the art to which it appertains to make and use the same.

My invention has for its principal object to provide a machine for hulling peas, beans, peanuts, etc., in an effective manner, provision being made whereby the cracked and small kernels or the like are separated from the selects and whereby any unhulled legumes will be returned to the machine to be further operated upon.

With the foregoing object in view the invention resides in the novel features of construction and unique combinations of parts to be hereinafter fully described and claimed, the descriptive matter being supplemented by the accompanying drawings which form a part of this application and in which:

Figure 1 is a side elevation of the improved machine.

Fig. 2 is substantially a central vertical longitudinal section.

Fig. 3 is an end elevation.

Figs. 4 and 5 are vertical transverse sections on the planes of the lines 4—4 and 5—5 respectively of Fig. 2.

Fig. 6 is an enlarged elevation of the slat holding means of the threshing drum.

Fig. 7 is a similar view with the slats removed.

Fig. 8 is a detail section on the plane of the line 8—8 of Fig. 6.

In the drawings above briefly described, the numeral 1 designates a suitable supporting frame upon which a hopper 2 is mounted to receive the peas, beans, peanuts or the like to be threshed or hulled. The outlet 3 of the hopper 2 discharges into a threshing cylinder 4 whose bottom is formed of slats 5, said slats projecting through semi-circular slots 6 in side walls 7 secured to the frame 1 and being held in spaced relation by wedges 8 driven radially inward and by master wedges 9. To retain the several wedges in place, semi-circular retaining bars 10 are secured by screws or the like 11 to the walls 7, said bars having seats 12 in their inner corners in which the outer ends of the wedges are received.

Located in the threshing cylinder 4 is a suitable rotary beater 13 whose shaft 14 is provided with a driving pulley 15 around which the belt 16 passes, it being the office of this beater to force the hulls of the legumes against the slats 5, whereby to break said hulls and liberate their contents. All parts of the beater 13 as well as the slats 5 are preferably formed of steel or other preferred metal to prevent breakage in case stones or the like should enter the machine.

A fan 17 is mounted on the frame 1 and driven by a belt 18 from the shaft 14, said fan having a discharge spout 19 with a contracted end 20 delivering into the lower end of an inclined hull discharge pipe or passage 21, said pipe or passage having an inlet 22 directly above the contracted end 20 of the spout 19 and positioned beneath the threshing chamber 4, whereby the discharge from the latter will enter the passage 21. A branch pipe 23 leads from the pipe 21, adjacent the contracted end 20 of spout 19, to a rotary separating and grading screen 24 driven by a belt 25 from the shaft 14, said belt passing over suitable guides 26. Hoppers 27 and 28 are located beneath the screen 24 and lead to suitable receptacles 29 and 30, the discharge spouts from said hoppers preferably having slide valves 31 and 32 which may be closed while dumping the receptacles. A pipe 33 leads from the delivery end of the screen 24 to a hopper 34 from which an endless belt conveyer 35 rises to an additional hopper 36 which at 37 discharges into the main hopper 2. A belt 38 drives the conveyer 35 from the shaft 14.

In operation, the peas, beans or the like to be hulled are placed in the hopper 2 and the vibration of the machine will feed them into the threshing chamber 4, in which chamber they are forced against and through the slats 5 by the rotary beater 13, thus breaking the majority of the pods or hulls. These pods or hulls, together with their former contents, enter the pipe or passage 21 through its inlet 22 and here encounter the strong blast from the fan 17. This blast carries off all of the hulls, while permitting the legumes and any unbroken hulls to pass through the pipe 23 to the screen 24. This screen deposits the small and cracked legumes into the hopper 27 from which they are discharged to the receptacle 29, while the select product is discharged into receptacle 30 by means of hopper 28. The unbroken hulls pass through the passage 33 to the hopper 34 and by the conveyer 35, hopper 36 and spout 37, are returned to the hopper 2 for retreatment. A branh pipe 21′ preferably connects the pipes 21 and 23 so that any peas or the like having a tendency to escape through the pipe 21 with the hulls, may be shunted to the pipe 23 through said branch pipe.

From the foregoing, taken in connection with the accompanying drawings, it will be obvious that although my invention is of simple and inexpensive nature, it will be highly efficient and in every way desirable, particular emphasis being laid upon the arrangement of pipes and passages for handling the threshed product, and upon the means for securing the slat retaining wedges in place. It is also worthy of note that the pipe 21 coöperates with the side walls 7 and with a transverse plate 7′ in forming a chamber in which the threshed product is received before being discharged through the inlet 22 of pipe 21, said chamber preferably having a top 7″ which may well be provided with a hinged section if required. By this arrangement, that is forming the aforesaid chamber of several parts used also for other purposes, the machine is greatly simplified and the cost of production is decreased. Another rather important feature is the means of returning the unhulled legumes to the machine for retreatment.

Since probably the best results are obtained from the details shown and described, these details are preferably followed, but within the scope of the invention as claimed, considerable latitude is allowed for making such minor changes as occasion may dictate.

I claim:

1. A legume hulling machine comprising threshing means, a hull discharge passage into which the threshed product is discharged from said threshing means, means for creating a draft of air through said passage to carry off the hulls, a branch passage leading from said hull passage, a separator to which said branch passage leads, and an additional branch passage connecting said hull passage with said first named branch passage.

2. A structure as specified in claim 1, together with a pair of vertical side walls at the ends of said threshing means, a transverse partition extending between said walls on one side of said threshing means, and a top extending from said partition to said hull discharge passage and from one side wall to the other, the top of said last named passage coöperating with the aforesaid top, with said side walls, and with said partition in forming a chamber to receive the threshed product before it is discharged into said hull outlet passage.

In testimony whereof I have hereunto set my hand.

TROY T. AMMONS.

Witnesses:
L. S. ROBY,
T. S. WOMBLE, Jr.